United States Patent Office 2,908,821
Patented Oct. 13, 1959

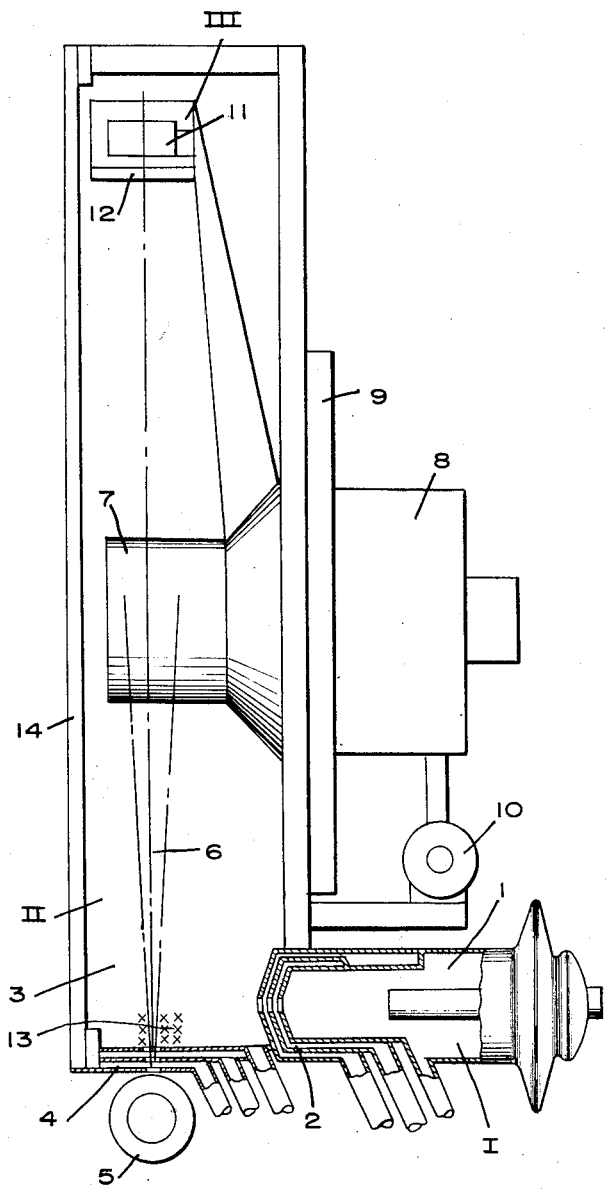

2,908,821

APPARATUS FOR SPECTROCHEMICAL ANALYSIS AND STRUCTURAL ANALYSIS OF SOLIDS, FLUIDS AND GASES BY MEANS OF X-RAYS

Wilhelm Walter Berthold Schumacher, Toronto, Ontario, Canada, assignor to Ontario Research Foundation, Toronto, Canada Application May 6, 1955, Serial No. 506,585

2 Claims. (Cl. 250—53)

Spectroscopic chemical analysis in the wavelength range of X-rays is as such a well-known procedure, but as is well known, too, until now it has had the disadvantage either that samples which have to be analyzed have to be put under vacuum or, in case the exitation of the characteristic radiation is done by harder X-rays, that the intensity of the characteristic radiation is extremely weak and its recording requires time consuming measurements or photographic exposures. It has already been suggested the sample be irradiated by electrons outside the vacuum. The electrons accelerated within a vacuum tube may be shot into the atmosphere through a foil window, or through a so-called dynamical pressure stage stretch continuously connected with vacuum pumps but without any foil window. The construction and operation of a form of such stage stretch is shown in co-pending United States application Ser. No. 386,083, filed October 14, 1953, and which is now U.S. Patent No. 2,899,556, granted August 11, 1959. By this means, the characteristic radiation of any sample can be exited with very high intensity. A last disadvantage which remains is: the characteristic radiation of samples with a low atomic number or the L and M-radiation of other materials will be absorbed in the air to such a degree, that it has been impossible until today to make reliable measurements in this range of wavelengths.

Now there exists a special interest in a method which makes it possible to determine all the components of a sample without exception by a spectroscopic method. At present, this is impossible within the range of visible light. Besides it is especially desirable that the sample will not be destroyed nor have to be put under vacuum.

The problem stated here, will be solved by the invention described in the following, comprising a device which makes it possible to excite the X-radiation of a sample by electron bombardment and to analyze this X-radiation by means of a vacuum spectrometer but without putting this sample totally or even partially under vacuum. The invention makes this possible by means of a pressure stage stretch continuously connected with vacuum pumps. Through this pressure stage stretch first electrons can be shot on the sample which has to be analyzed and which is situated completely under atmospheric pressure. Second, through this pressure stage stretch the X-rays excited by the electrons can re-enter the vacuum chamber the electrons came from and in which vacuum chamber the X-rays can be analyzed spectrographically or spectroscopically.

The source for the electrons can be situated within the same vacuum chamber in which the spectrometer for the X-rays is situated. The electrons can be shot through the pressure stage stretch in a direction deviating from the axis of the X-ray spectrometer only a few degrees. Or, which makes no difference with regards to the principle of the device but may simplify the design, the electron beam can be deflected electrically or magnetically into the path of the X-rays before passing through the pressure stage stretch.

Furthermore, the invention comprises that the chamber in which the electron beams are produced is separated from the chamber in which the X-rays are analyzed by another pressure stage stretch.

Besides the spectrochemical analysis mentioned, it is possible to make structural analysis. The apparatus allows the production of so-called "lattice-source interferences" which give information concerning the crystalline structure of the sample. This represents a new possibility for the determination of internal strain of machine parts, etc., which is highly important from a technical and economic point of view.

The device according to the invention may have a basic design as shown in the figure.

Within the cathode ray tube 1 (room I) electrons are accelerated to a voltage suitable for the excitation of X-rays. Through a pressure stage stretch 2, connected with vacuum pumps, they are shot into another chamber 3 (room II) in which the gas pressure may be zero or a high pressure or changing from the one to the other. If, which is possible too, the pressure stage stretch 2 is dispensed with, room II has to be evacuated always. After travelling some distance in room II the electrons are deflected by a magnetic field by an angle of, say, 90°, then pass the pressure stage stretch 4 and hit immediately behind it the sample 5 to be analyzed and excite the characteristic X-radiation of this sample. These X-rays now pass the pressure stage stretch 4 in the opposite direction, penetrating room II. More precisely, a whole conical beam 6, limited on its sides only by the aperture of the openings of the pressure stage stretch, enters room II.

In case room II is evacuated the X-ray will be neither attenuated nor scattered even if they are of the long wavelength range as for example the characteristic radiation of carbon. The X-rays are analyzed by a spectrometer 7 in one of the well known ways. It is situated within room II in such a way as to let the X-rays cone 6 hit its analyzer and at the same time placing the X-ray source on the focussing circle of the analyzer. The gear 8, scale 9, and motor 10 which are part of the spectrometer may be situated outside of room II.

The X-ray detector 11 which belongs to the spectrometer may be a photographic film, placed within room II, or it may be an ionisation chamber, proportional counter, parallel plate counter, luminophor with photo cell or photo-multiplier tube which are all well known instruments. It would be impossible for soft X-rays to penetrate the foil window of such an instrument. Therefore, another pressure stage stretch 12 may be employed to separate the detector 11 from room II, forming a new room III which even may be used directly as an ionisation chamber, parallel plate counter, etc. It may be placed on an arm moving back and forth the focussing circle of the spectrometer.

The basic apparatus described so far may be refined and improved by some other means. It may be suitable to use a cathode ray tube with cold cathode, because there are already vacuum pumps in use for the pressure stage stretches. It is suitable to build the pressure stage stretch 4 with three or four stages keeping the stage at the side of the sample under pressure somewhat higher than atmospheric pressure to avoid having the sample sucked in or pressure changes in chamber II. This "sheet of gas" may be kept thinner than .1 mm. thus keeping the attenuation of the electron beam and the X-rays negligible. Employing such a high pressure stage especially makes it possible that fluids to be analyzed may flow along the outer wall of this pressure stage stretch without being sucked in.

To analyze the X-radiation, mainly the well known spectrometer arrangements with a plane or curved crystal may be used, but for the longer wavelength mechanically made gratings are suitable. It is also possible to place several of these items above one another and to provide each one with its own detector to scan the whole spectral range with one turn of the detector arm.

Mostly the detector arm of the spectrometer has to move with twice the angular velocity of the grating or crystal. To avoid two shafts having to go vacuum tight into room II it is advisable to place the 2:1 gear inside room II. The main shaft may carry the electrical conductors leading to the detector as well as the pipes leading to pressure stage stretch 12. Then, on the other end of the shaft may be put the graduated circle for the angular measurements and the motor, etc., for driving the spectrometer arm.

For measuring soft X-rays the invention suggests, as mentioned above, the separation of the detector from the spectrometer room by a pressure stage stretch. Because the detector has to have the highest constancy possible, it is suggested furthermore to separate a part of the detector room electrically, to irradiate this part by the constant radiation of an alpha-, beta-, or gamma-radiator, to register separately the ionisation or the impulse rate produced by this radiation and to keep this ionisation or pulse rate constant by controlling the pressure at one or more stages of the pressure stage stretch, thus controlling the sensitivity of the whole detector at a constant level.

The detector for the radiation will be supplemented by suitable electronic measuring sets. The pulses produced in the detector by the X-quanta may be just counted in the simplest way or, even more primitively, the current of an ionisation chamber or of a photo cell or photo-multiplier tube with luminophor may be measured by a D.C. method. For more subtle measurements it will be helpful to measure not only the angle of spectral lines but also the energy of the quanta. In practice, an impulse amplitude discriminator will be used in connection with a proportional counter. Herewith it is possible to cancel background pulses or pulses produced by a longer or shorter wavelength reflected by the crystal of the spectrometer in a higher or lower order of reflection.

It lies also within the range of the invention to use more than one detector, either fixed or moveable, especially for determination of more than one component in one test only.

One detector may be placed within the primary X-ray beam for reference measurements or to control its intensity at a constant level.

Also it lies within the range of the invention to interchange the spectrometer crystal with a simple of an unknown substance the structure of which has to be tested by a Debye-Scherrer-Diagram. In this case the X-rays may come from an outside source entering the apparatus through the pressure stage stretch 4 and the apparatus will only be used as a vacuum spectrometer. But it will also be possible—an essential advantage of this new design—to put different targets in the electron beam formerly shot on the sample. Thus targets of a suitable substance for each purpose may be placed before or behind the pressure stage stretch 4. In each case the X-ray source is situated on the focussing circle of the spectrometer, and the radiation is not weakened by the windows or diaphragms of an X-ray tube. Besides the softest radiation may be used if room II is evacuated.

What I claim as my invention is:

1. Apparatus for spectrochemical and structural analysis of solids, liquids and gases by means of X-rays which comprises a first vacuum chamber, a first pressure stage stretch providing a passage from said first vacuum chamber to the atmosphere, a second vacuum chamber, a second pressure stage stretch providing a passage between said first vacuum chamber and said second vacuum chamber, means located within said second vacuum chamber adapted to provide and focus an electron beam and to direct said beam from within said second vacuum chamber through said first and second pressure stage stretch into the atmosphere at an object to excite X-radiation thereof, at least one diffraction element located within said first vacuum chamber adapted to separate X-rays of different wave lengths after entry thereof through said first pressure stage stretch into said first vacuum chamber and at least one detector located in said first vacuum chamber and adapted to measure the intensity of said separated X-rays.

2. The method of spectrochemical and structural analysis of solids, liquids and gases by means of X-rays which comprises producing and focusing an electron beam within a vacuum, directing said beam from within said vacuum through a pressure stage stretch into the atmosphere at an object to excite X-radiation thereof, passing the X-rays thus excited through the pressure stage stretch into the vacuum, and analyzing and detecting said X-rays in said vacuum by means of an X-ray spectrometer.

References Cited in the file of this patent

UNITED STATES PATENTS

| 2,418,029 | Hillier | Mar. 25, 1947 |
| 2,540,821 | Harker | Feb. 6, 1951 |
| 2,640,948 | Burrill | June 2, 1953 |
| 2,727,153 | Coltman | Dec. 13, 1955 |
| 2,745,966 | Verhoeff | May 15, 1956 |
| 2,843,750 | Hillier | July 15, 1958 |

OTHER REFERENCES

G. L. Clark: "Applied X-Rays," 1940 edition, pages 126 to 128.